(12) United States Patent
Jeong et al.

(10) Patent No.: US 11,289,112 B2
(45) Date of Patent: Mar. 29, 2022

(54) APPARATUS FOR TRACKING SOUND SOURCE, METHOD OF TRACKING SOUND SOURCE, AND APPARATUS FOR TRACKING ACQUAINTANCE

(71) Applicant: SAMSUNG ELECTRONICS CO., LTD., Suwon-si (KR)

(72) Inventors: Boreum Jeong, Suwon-si (KR); Wontaek Seo, Yongin-si (KR); Youngtek Oh, Suwon-si (KR); Yunju Yu, Suwon-si (KR); Moonil Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 16/715,721

(22) Filed: Dec. 16, 2019

(65) Prior Publication Data

US 2020/0342894 A1 Oct. 29, 2020

(30) Foreign Application Priority Data

Apr. 23, 2019 (KR) .................. 10-2019-0047513

(51) Int. Cl.
*G10L 25/51* (2013.01)
*G10L 15/22* (2006.01)
*G10L 21/0272* (2013.01)
(52) U.S. Cl.
CPC .............. *G10L 25/51* (2013.01); *G10L 15/22* (2013.01); *G10L 21/0272* (2013.01)

(58) Field of Classification Search
CPC combination set(s) only.
See application file for complete search history.

(56) References Cited

U.S. PATENT DOCUMENTS

| 8,494,507 | B1 * | 7/2013 | Tedesco | G09B 21/009 |
| | | | | 455/418 |
| 9,084,057 | B2 * | 7/2015 | Turqueti | H04R 1/326 |
| 9,852,620 | B1 * | 12/2017 | Hoeft | G08C 23/02 |
| 2004/0254982 | A1 * | 12/2004 | Hoffman | H04L 67/36 |
| | | | | 709/204 |
| 2011/0125496 | A1 * | 5/2011 | Asakawa | G10L 21/0272 |
| | | | | 704/231 |
| 2017/0019744 | A1 * | 1/2017 | Matsumoto | G06K 9/00771 |
| 2017/0213459 | A1 * | 7/2017 | Ogaz | G08G 1/166 |
| 2018/0027325 | A1 * | 1/2018 | Kim | H04R 1/406 |
| | | | | 381/92 |

(Continued)

FOREIGN PATENT DOCUMENTS

KR 10-1281129 B1 7/2013
KR 10-1435629 B1 8/2014
(Continued)

*Primary Examiner* — Duc Nguyen
*Assistant Examiner* — Assad Mohammed
(74) *Attorney, Agent, or Firm* — Sughrue Mion, PLLC

(57) ABSTRACT

Provided is a sound source tracking apparatuses including a vibration unit including vibrators configured to vibrate in response to an ambient sound, the ambient sound including individual sounds, and a processor configured to separate the ambient sound into individual sounds, to determine a target individual sound having a target tone color among the individual sounds, and to obtain a relative location of a target sound source that generates the target individual sound.

20 Claims, 13 Drawing Sheets

(56) References Cited

U.S. PATENT DOCUMENTS

2019/0047500 A1* 2/2019 Ghannam ............. B60R 21/013

FOREIGN PATENT DOCUMENTS

| KR | 10-1701676 B1 | 2/2017 |
| KR | 10-2017-0025231 A | 3/2017 |
| KR | 10-2018-0040546 A | 4/2018 |
| KR | 10-2018-0074200 A | 7/2018 |
| KR | 10-1883703 B1 | 7/2018 |

* cited by examiner

APPARATUS FOR TRACKING SOUND SOURCE, METHOD OF TRACKING SOUND SOURCE, AND APPARATUS FOR TRACKING ACQUAINTANCE

CROSS-REFERENCE TO RELATED APPLICATION

This application claims priority to Korean Patent Application No. 10-2019-0047513, filed on Apr. 23, 2019 in the Korean Intellectual Property Office, the disclosure of which is incorporated herein in its entirety by reference.

BACKGROUND

1. Field

Example embodiments of the present disclosure relate to apparatuses for tracking a sound source, methods of tracking a sound source, and apparatuses for tracking an acquaintance.

2. Description of the Related Art

Generally, a sound source tracking technique is a technique for determining a location of a sound source by analyzing a signal input to a microphone array in which a plurality of microphones are arranged in series or in parallel. In detail, the location of a sound source is detected by a method of finding an angle at which the power of a signal is maximum after compensating for an input signal of each microphone according to a difference in sound arrival time due to a difference of a sound transmission path from a location of an arbitrary sound source to each microphone. A sound source tracking technique may be used not only in household appliances but also in devices such as service robots that support housework, surveillance cameras that track sound sources and intruders, and video cameras used in multi-way video conferences.

SUMMARY

One or more example embodiments provide apparatuses for tracking a required sound source among a plurality of sound sources.

One or more example embodiments also provide methods of tracking a required sound source among a plurality of sound sources.

One or more example embodiments also provide apparatuses for tracking an acquaintance among people.

Additional aspects will be set forth in part in the description which follows and, in part, will be apparent from the description, or may be learned by practice of the example embodiments.

According to an aspect of an example embodiment, there is provided a sound source tracking apparatus including a vibration unit including vibrators configured to vibrate in response to an ambient sound, the ambient sound including individual sounds, and a processor configured to separate the ambient sound into individual sounds, to determine a target individual sound having a target tone color among the individual sounds, and to obtain a relative location of a target sound source that generates the target individual sound.

The processor may be further configured to generate information about tone colors of the individual sounds based on output waveforms of the vibrators, and determine the target individual sound by comparing the tone colors of the individual sounds with the target tone color.

The sound source tracking apparatus may further include a memory configured to store information about the target tone color, wherein the processor may be further configured to determine the target individual sound by comparing the information about the target tone color stored in the memory with information about the tone colors of the individual sounds.

The sound source tracking apparatus may further include a communication interface configured to receive information about the target tone color from a server, wherein the processor may be further configured to determine the target individual sound by comparing the information about the target tone color with information about the tone colors of the individual sounds.

The processor may be further configured to obtain directions of sound sources that generate the individual sounds based on output intensities of the vibrators, and separate the ambient sound into the individual sounds based on the directions of the sound sources.

The processor may be configured to obtain the relative location of the target sound source by obtaining a distance between the vibrator and the target sound source based on the output intensities of the vibrators and by obtaining a direction of the target sound source based on the output intensities of the vibrators.

The sound source tracking apparatus may further include an image output interface configured to output the relative location of the target sound source as an image based on information about the relative location of the target sound source received from the processor.

The sound source tracking apparatus may further include a sound output interface configured to output the relative location of the target sound source as a voice based on information about the relative location of the target sound source received from the processor.

The sound source tracking apparatus may further include a communication interface configured to receive global positioning system coordinates, wherein the processor may be further configured to obtain an absolute location of the target sound source based on GPS coordinate information and information about the relative location of the target sound source.

According to another aspect of an example embodiment, there is provided a method of tracking a sound source, the method including collecting an ambient sound and separating the ambient sound into individual sounds, determining a target individual sound among the individual sounds, and obtaining a relative location of a target sound source that generates the target individual sound, wherein the target individual sound is an individual sound having a target tone color among the individual sounds, and wherein the individual sounds are separated from the ambient sound based on output intensities of vibrators that vibrate in response to the ambient sound.

The method may further include generating information about tone colors of the individual sounds based on output waveforms of the vibrators, wherein the determining of the target individual sound may include comparing the tone colors of the individual sounds with the target tone color.

The method may further include obtaining directions of sound sources that generate the individual sounds based on the output intensities of the vibrators, wherein the individual sounds are separated from the ambient sound based on the directions of the sound sources.

The obtaining of the relative location of the target sound source may include obtaining a distance between a location where the ambient sound is collected and the target sound source based on the output intensities of the vibrators, and obtaining a direction of the target sound source based on the output intensities of the vibrators.

The method may further include outputting information of the relative location of the target sound source on a display interface.

The method may further include obtaining an absolute location of the target sound source based on global positioning system coordinates of a location where the ambient sound is collected and the relative location of the target sound source.

According to yet another aspect of an example embodiment, there is provided an acquaintance tracking apparatus including a vibrator including vibrators configured to vibrate in response to ambient voices, the ambient voices including individual voices, a processor configured to determine a voice of an acquaintance among individual voices and to obtain a relative location of the acquaintance, and a display interface outputting the relative location of the acquaintance.

The processor may be further configured to generate information of tone colors of the individual voices based on the output waveforms of the vibrators and determine the acquaintance voice by comparing the tone colors of the individual voices with information about a tone color of the acquaintance voice.

The acquaintance tracking apparatus may further include a memory configured to store information about the tone color of the voice of the acquaintance, wherein the processor may be further configured to determine the voice of the acquaintance by comparing information about the tone color of the acquaintance voice stored in the memory with information about the tone colors of the individual voices.

The acquaintance tracking apparatus may further include a communication interface configured to receive information about the tone color of the voice of the acquaintance from a server, wherein the processor may be further configured to determine the voice of the acquaintance by comparing information about the tone color of the voice of the acquaintance with information about tone colors of the individual voices.

The processor may be further configured to obtain the relative location of the acquaintance by obtaining a distance between the vibrator and the acquaintance based on the output intensities of the vibrators, and by obtaining a direction of the acquaintance based on the output intensities of the vibrators

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
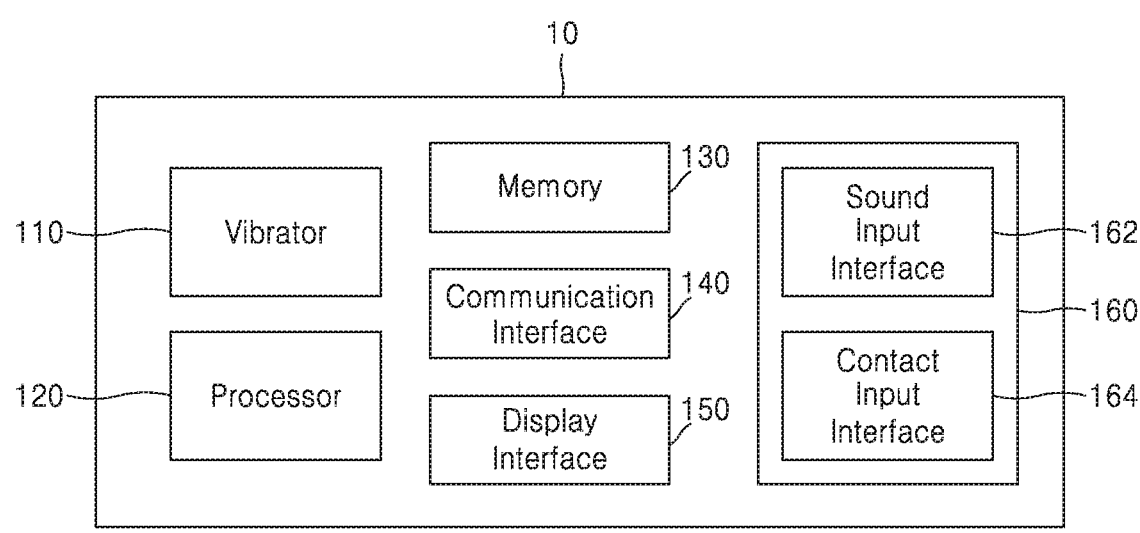
FIG. 1 is a block diagram of an apparatus for tracking a sound source according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the drawings, like reference numerals indicate identical elements, and a size of constituent elements in the drawings may be exaggerated for clarity and convenience of explanation.

It will be understood that when an element or layer is referred to as being "on" or "above" another element or layer, the element or layer may be directly on another element or layer or intervening elements or layers.

As used herein, the singular forms are intended to include the plural forms as well, unless the context clearly indicates otherwise. Also, when a region "includes" a constituent element, the region may further include another element instead of excluding the other element, unless otherwise differently stated.

Also, in the specification, the term "units" denotes a unit that processes at least one of function or operation, and the "unit" may be realized by hardware or software or a combination of hardware and software.

Figure 2:
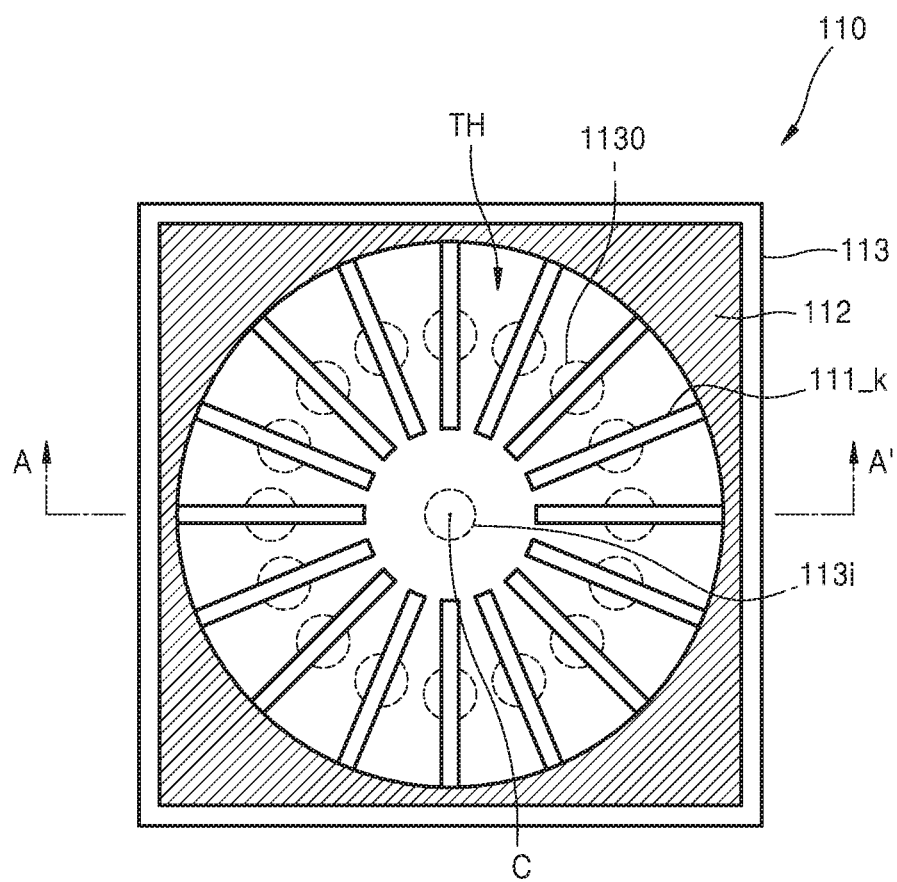
FIG. 2 is a plan view of a vibration unit according to an example embodiment.
Figure 3:
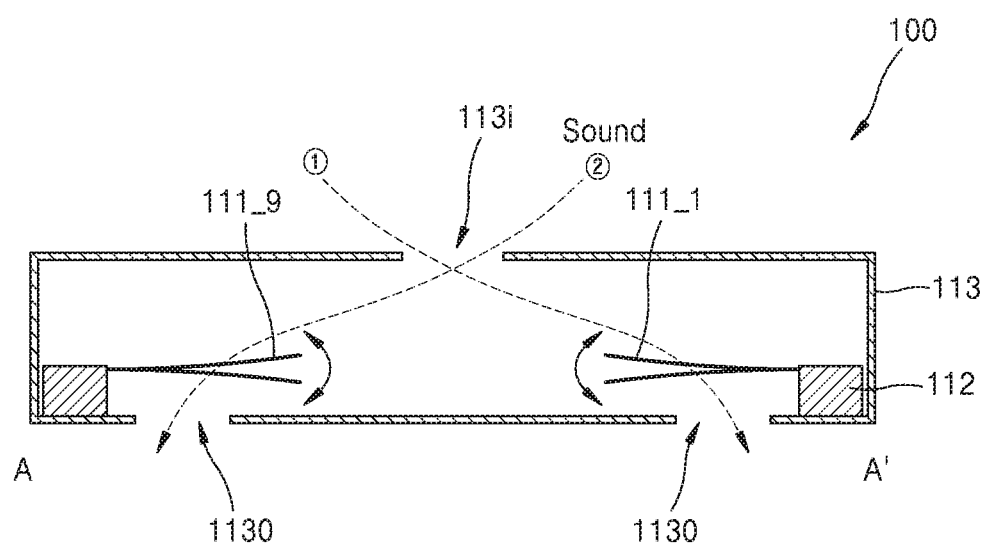
FIG. 3 is a cross-sectional view taken along line A-A' of the vibration unit of FIG. 2.

FIG. 1 is a block diagram of an apparatus for tracking a sound source (hereinafter, a sound source tracking apparatus 10) according to an example embodiment. FIG. 2 is a plan view of a vibration unit 110 according to an example embodiment. FIG. 3 is a cross-sectional view of the vibration unit 110 of FIG. 2.

Referring to FIGS. 1 through 3, the sound source tracking apparatus 10 including the vibration unit 110 and a processor 120 may be provided. The sound source tracking apparatus 10 may include a mobile terminal. For example, the sound source tracking apparatus 10 may include mobile phones, smart phones, notebook computers, digital broadcasting terminals, personal digital assistances (PDAs), portable multimedia players (PMPs), navigations, tablet personal computers (PCs), watch-type terminals (smartwatches), glasses-type terminals (smart glasses), head mounted displays (HMDs), etc.

Referring to FIG. 2, the vibration unit 110 may include a plurality of vibrators 111_k configured to vibrate in response to an ambient sound, a sound inlet 113i to which the ambient sound enters, and sound outlets 1130 through which the ambient sound inputs through the sound inlet 113i are emitted. The ambient sound may include a plurality of individual sounds. The plurality of individual sounds may have tone colors different from each other. The plurality of individual sounds respectively may be generated from a plurality of sound sources.

The plurality of vibrators 111_k may be arranged between the sound inlet 113i and the sound outlets 1130. When the number of vibrators 111_k is N, k is an integer from 1 to N. The physical angular resolution of the vibration unit 110 may be determined by the number N of vibrators 111_k. For example, the physical angular resolution of the vibration unit 110 may be expressed as 360°/N. The processor 120 may detect entering directions of entering sounds by comparing the intensity of an output signal of each of the plurality of vibrators 111_k, and the greater the number of vibrators 111_k to be compared with each other, the higher the angular resolution that may be obtained. An output signal of each of the plurality of vibrators 111_k may correspond to vibrations of each of the plurality of vibrators 111_k. The intensity of an output signal of each of the plurality of vibrators 111_k may be proportional to a vibration amplitude of each of the plurality of vibrators 111_k. A waveform of an output signal of each of the plurality of vibrators 111_k may be proportional to a vibration waveform of each of the plurality of vibrators 111_k.

The plurality of vibrators 111_k may be arranged to selectively respond to at least one of the plurality of vibrators 111_k according to sound directions input to the sound inlet 113i. The plurality of vibrators 111_k may be arranged to surround peripherals of the sound inlet 113i. The plurality of vibrators 111_k may be arranged in a plane without overlapping with each other and may be arranged so that all of the plurality of vibrators 111_k are exposed with respect to the sound inlet 113i. As depicted in FIG. 2, the plurality of vibrators 111_k may be arranged on the same plane. Also, the plurality of vibrators 111_k may be arranged in a shape surrounding the center point C on the plane vertically facing the center of the sound inlet 113i. In FIG. 2, it is depicted that the plurality of vibrators 111_k surround the center point C, but embodiments are not limited thereto, and the plurality of vibrators 111_k may be arranged in various forms having symmetry about the center point C. For example, the plurality of vibrators 111_k may be arranged in the form of a polygonal or elliptical trajectory.

The sound outlets 1130 may be provided in the same number as the number of vibrators 111_k and may be arranged to respectively face the plurality of vibrators 111_k. Sizes and shapes of the sound inlet 113i and the sound outlets 1130 are not specifically limited, and the sound inlet 113i and the sound outlets 1130 may have arbitrary sizes and shapes capable of exposing the plurality of vibrators 111_k to the same extent.

In order to form the sound inlet 113i and the sound outlets 1130, a case 113 in which openings corresponding to the shapes of the sound inlet 113i and the sound outlets 1130 may be used. The case 113 may include various materials that block a sound. For example, the case 113 may include a material like aluminum. The sound inlet 113i and the sound outlets 1130 formed in the case 113 are not limited to the shapes depicted in FIG. 2.

A supporting unit 112 that supports the plurality of vibrators 111_k and provides spaces for vibrating the plurality of vibrators 111_k in response to sounds may be arranged in the case 113. The supporting unit 112, as depicted in FIG. 2, may be formed by forming a through hole TH in a substrate. The plurality of vibrators 111_k are supported at one end by the support portion 112 and may be arranged to face the through hole TH. The through hole TH provides a space for vibrating the plurality of vibrators 111_k by an external force, and, as long as the space satisfies the above condition, the size or shape of the through hole TH is not specifically limited. The supporting unit 112 may include various materials, such as silicon.

At least one vibrator 111_k of the plurality of vibrators 111_k located on a path through which a directional sound enters may vibrate in response to the sound. For example, as depicted in FIG. 3, when a sound enters through a path ①, one or more vibrators located on or adjacent to the path ① including the vibrator 111_1 may vibrate. Also, when a sound enters through a path ②, one or more vibrators located on or adjacent to the path ② including the vibrator 111_9 may vibrate. Accordingly, a direction of incident sound may be detected considering an output of the plurality of vibrators 111_k according to the direction of the incident sound. Each of the plurality of vibrators 111_k has a preferred angle depending on its arrangement location, which is referred to as a principal direction. In forming an output sound, a sound in the principal direction largely contributes to the output sound and sounds in directions other than the principal direction contributes less to the output sound. Accordingly, for a sound entering in an arbitrary direction, the direction of the incident sound may be detected by comparing an output intensity of each of the plurality of vibrators 111_k.

The processor 120 may separate the ambient sound into a plurality of individual sounds different from each other based on intensities of output signals of the plurality of vibrators 111_k. For example, the processor 120 may detect directions of two or more sound sources at different locations in an azimuth direction by comparing intensities of the output signals of the plurality of vibrators 111_k and may select vibrators for acquiring sound information based on the directions of the detected sound sources. The plurality of individual sounds may be separated from the ambient sound by selecting the plurality of vibrators 111_k.

The processor 120 may determine a target individual sound from the plurality of individual sounds. The target individual sound may be an individual sound having a target tone color. The processor 120 may generate information about tone colors of the plurality of individual sounds based on waveforms of output signals of the plurality of vibrators 111_k. The processor 120 may determine an individual sound having a tone color that is substantially the same as a target tone color of a target individual sound by comparing the tone colors of the plurality of individual sounds with the target tone color. In example embodiments, information about the target tone color may be stored in advance in a memory 130 which will be described below. In other example embodiments, the information about the target tone color may be provided to the processor 120 from a server by a communication interface 140 which will be described below.

The processor 120 may measure distances between the sound source tracking apparatus 10 and a plurality of sound sources based on intensities of output signals of the plurality of vibrators 111_k. For example, the processor 120 may determine values corresponding to the intensities of the output signals of the plurality of vibrators 111_k as the distances between the sound source tracking apparatus 10 and the sound sources that generate a plurality of individual sounds corresponding to the plurality of vibrators 111_k by using matching data.

The sound source tracking apparatus 10 may further include the memory 130. The memory 130 may store data supporting various functions of the sound source tracking apparatus 10. The memory 130 may store an application program to be driven by the sound source tracking apparatus 10, data for operating the sound source tracking apparatus 10, and commands. The application program may be stored in the memory 130 and may be installed in the sound source tracking apparatus 10 to be driven by the processor 120 to perform functions of the sound source tracking apparatus 10. In example embodiments, the memory 130 may store tone color information of a target individual sound. In other example embodiments, the memory 130 may not store tone color information of the target individual sound. The memory 130 may store data, such as sensitivities of the plurality of vibrators 111_k according to incidence directions of a plurality of individual sounds.

The sound source tracking apparatus 10 may further include the communication interface 140. The communication interface 140 may include at least one element that enables communication between the sound source tracking apparatus 10 and external electronic devices or between the sound source tracking apparatus 10 and a server. For example, communication by the communication interface 140 may include a near field communication, (for example, a Bluetooth communication, a Bluetooth low energy (BLE) communication, a near field wireless communication, a wireless LAN (WLAN-WiFi) communication, a Zigbee communication, an infrared data association (IrDA) communication, a Wi-Fi Direct (WFD) communication, an ultra-wideband (UWB) communication, and an Ant+ communication. The communication interface 140 may also include at least one of mobile communication interface. The mobile communication interface may transmit and receive wireless signals to and from at least one of a base station, an external terminal, and a server on a mobile communication network. The wireless signals may include various types of data according to transmission and reception of a voice signal, a video call signal, or a text/multimedia message. The communication interface 140 may receive global positioning system (GPS) coordinates of the sound source tracking apparatus 10.

The sound source tracking apparatus 10 may further include a display interface 150. The display interface 150 may include an image output interface and a sound output interface. The image output interface may represent a relative location and/or an absolute location of a target sound source as an image. For example, a direction of a target sound source with respect to the sound source tracking apparatus 10 may be represented as an arrow, and a distance between the sound source tracking apparatus 10 and the target sound source may be represented as a figure. The sound output interface may represent a relative location and/or an absolute location of a target sound source as a sound.

The sound source tracking apparatus 10 may further include an input interface 160. The input interface 160 may include a sound input interface 162 and a contact input interface 164. The sound input interface 162 may collect an ambient sound of the sound source tracking apparatus 10. For example, the sound input interface 162 may include a microphone or a microphone array. The contact input interface 164 may receive information by a contact input from a user. For example, the contact input interface 164 may include a touch key and/or a push key (mechanical key). The user may select a sound having a target tone color through the contact input interface 164.

The example embodiment may provide the sound source tracking apparatus 10 for tracking a location of a target sound source among a plurality of sound sources.

Figure 4:
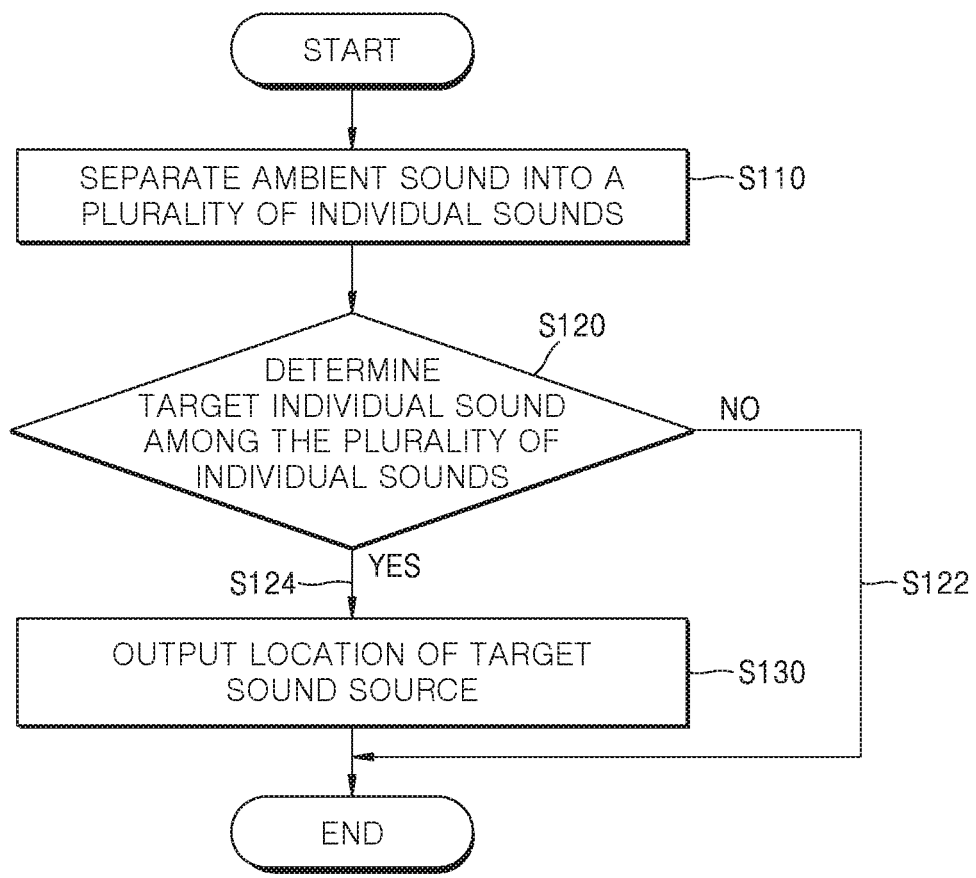
FIG. 4 is a flowchart of a method of tracking a sound source according to an example embodiment.

FIG. 4 is a flowchart of a method of tracking a sound source according to an example embodiment. FIGS. 5 through 8 are diagrams illustrating the method of tracking a sound source of FIG. 4.

Figure 5:
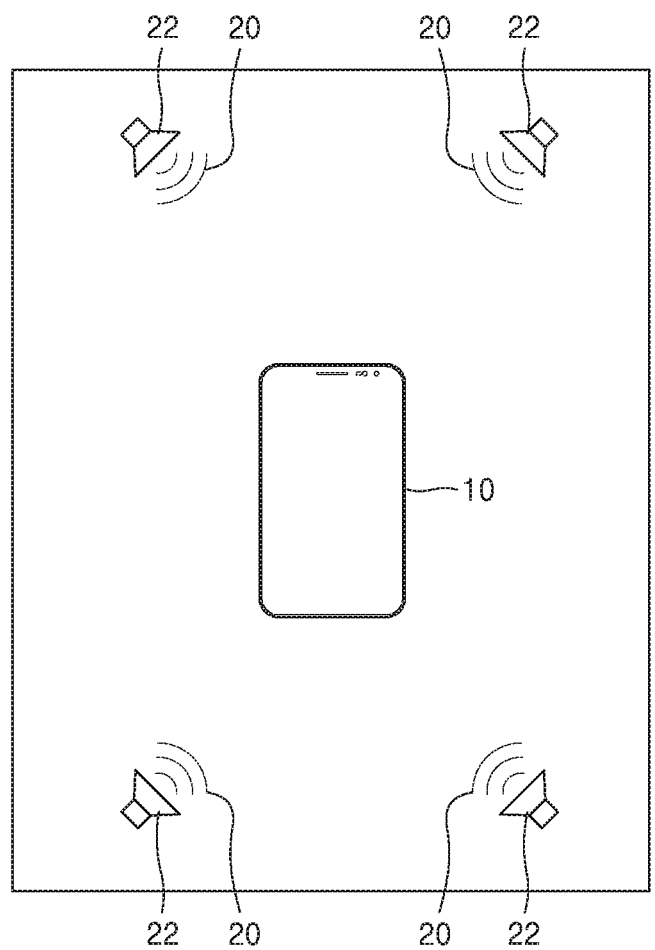
FIG. 5 is a diagram for explaining the method of tracking a sound source of FIG. 4.
Figure 6:
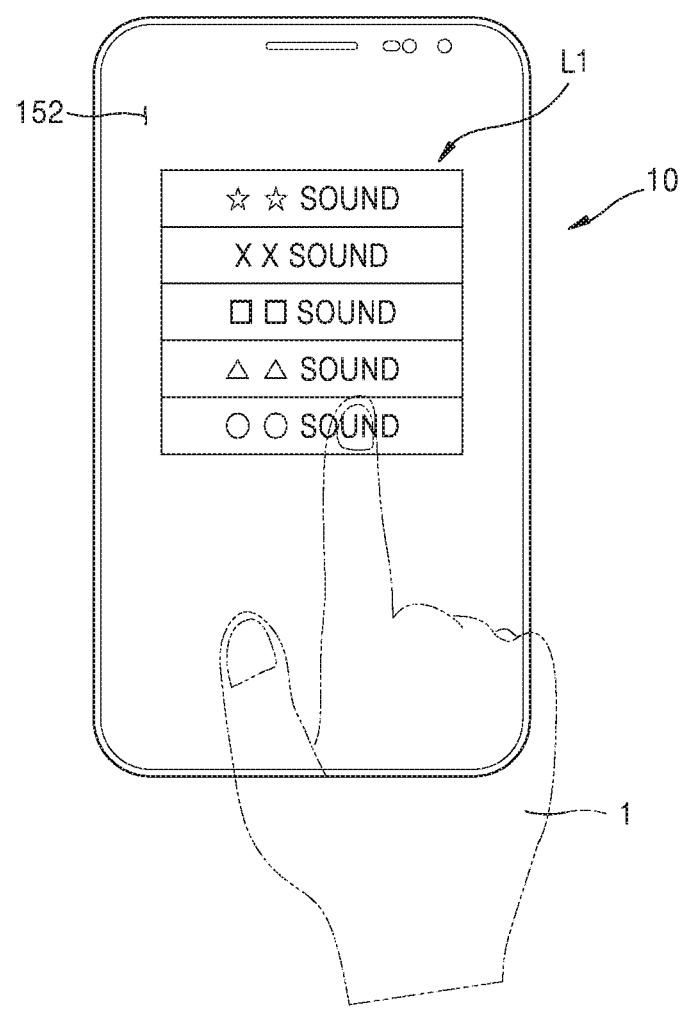
FIG. 6 is a diagram for explaining the method of tracking a sound source of FIG. 4.

Referring to FIGS. 4, 5, and 6, a sound source tracking apparatus 10 may be provided between a plurality of sound sources 22. The sound source tracking apparatus 10 may be substantially the same as the sound source tracking apparatus 10 described with reference to FIGS. 1 through 3. The plurality of sound sources 22 may generate an ambient sound. The ambient sound may include a plurality of individual sounds 20 respectively generated by the plurality of sound sources 22. The plurality of individual sounds 20 respectively may have tone colors different from each other.

A processor may separate the ambient sound into the plurality of individual sounds 20 (S110). For example, the processor may separate the plurality of individual sounds 20 from the ambient sound based on output intensities of a plurality of vibrators provided from a vibration unit. For example, the processor may detect two or more directions of sound sources at different locations in the azimuth direction by comparing the intensities of output signals of the plurality of vibrators and may select the vibrators capable of acquiring sound information based on the detected directions of the sound sources. A plurality of individual sounds 20 may be separated from the ambient sound by selecting the vibrators.

The processor may determine a target individual sound among the plurality of individual sounds 20 (S120). The target individual sound may be an individual sound having a target tone color among the plurality of individual sounds 20. The target tone color may be a tone color of the sound that a user 1 is seeking. As depicted in FIG. 6, a sound having a target tone color may be selected by the user 1.

The selection of a sound having a target tone color may be performed by using a contact input interface. For example, a sound having a target tone color may be selected by touching any one of a sound list SL displayed on the image output interface 152 by the user 1. In example embodiments, information of a target tone color may be stored in a memory in advance. In other example embodiments, information of a target tone color may be provided to a server by a communication interface.

Of the plurality of individual sounds 20, if there is no target individual sound among a plurality of individual sounds (S122), the processor may terminate the location tracking about the sound source 22.

Figure 7:
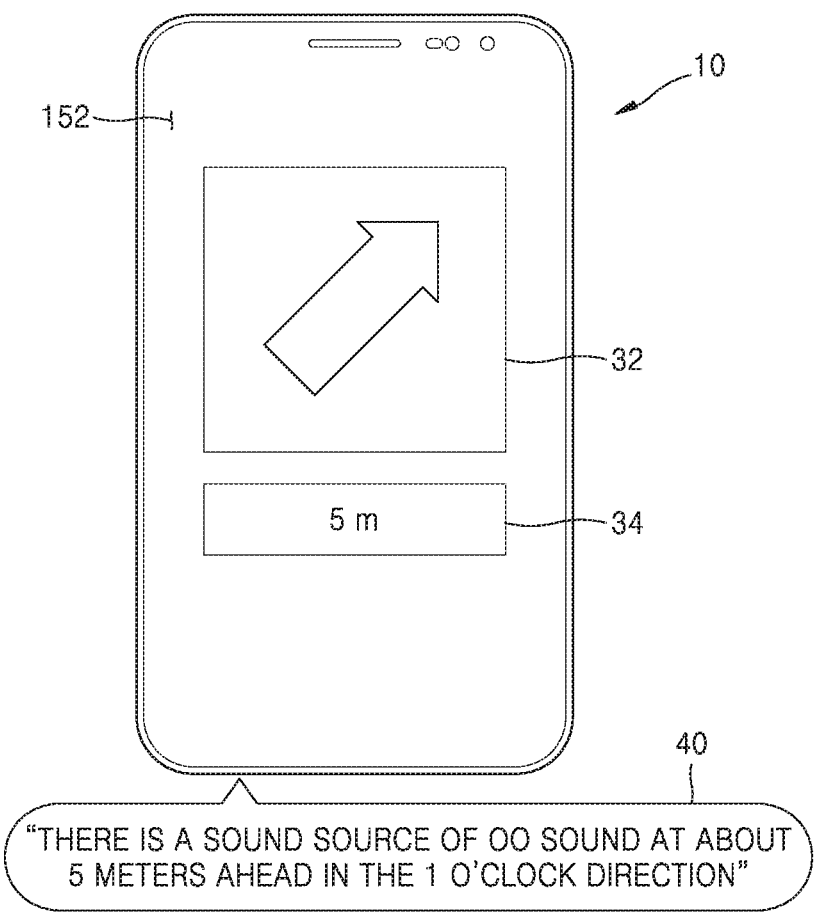
FIG. 7 is a diagram for explaining the method of tracking a sound source of FIG. 4.
Figure 8:
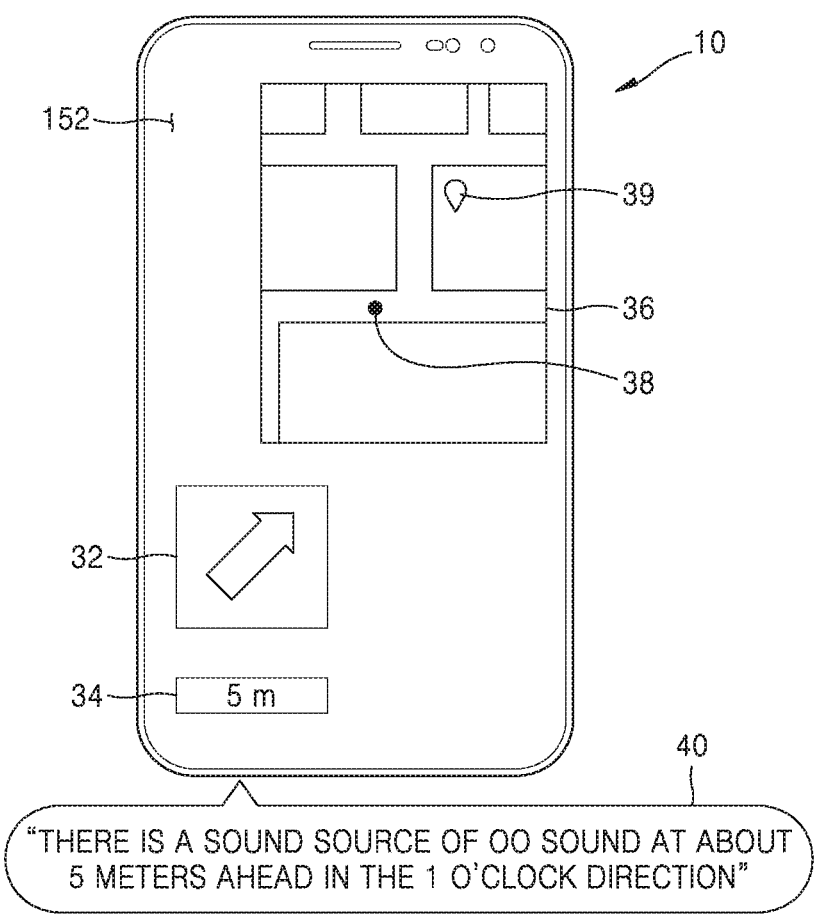
FIG. 8 is a diagram for explaining the method of tracking a sound source of FIG. 4.

Referring to FIGS. 4, 7, and 8, if there is a target individual sound (S124) among the plurality of individual sounds 20, a display interface is controlled by the processor to output a location of a sound source 22 (hereinafter, a target sound source 22) that generates a target individual sound (S130). As depicted in FIG. 7, the image output interface 152 and the sound output interface 154 may output a relative location of the target sound source 22. The image output interface 152 may display a direction image 32 of the target sound source 22 about the sound source tracking apparatus 10 and a distance image 34 between the sound source tracking apparatus 10 and the target sound source 22. For example, the image output interface 152 may output an arrow and a figure as the direction image 32 and the distance image 34, respectively. The sound output interface 154 may output a guidance voice 40 about a direction of the target sound source 22 to the sound source tracking apparatus 10 and a distance between the sound source tracking apparatus 10 and the target sound source 22. For example, the sound output interface 154 may output a guidance voice 40 that says "there is a sound source of ○○ sound at about 5 meters ahead in the 1 o'clock direction".

As depicted in FIG. 8, the display interface 150 may output a relative location and an absolute location of the target sound source 22. For example, the image output interface 152 may output a map 36 on which a location image 38 of the sound source tracking apparatus 10 and an absolute location image 39 of the target sound source 22 are shown. Although it is depicted that the sound output interface 154 outputs the guidance voice 40 about the relative location of the target sound source 22, embodiments are not limited thereto. For example, the sound output interface 154 may output a guidance voice 40 about an absolute location of the target sound source 22.

When a distance between the sound source tracking apparatus 10 and the target sound source 22 is less than a certain value, the sound source tracking apparatus 10 may terminate the location tracking about the target sound source 22. For example, when a distance between the sound source tracking apparatus 10 and the target sound source 22 is less than one meter, the location tracking of the target sound source 22 may be terminated.

The example embodiment may provide a method of tracking a location of the target sound source 22 among a plurality of sound sources.

Figure 9:
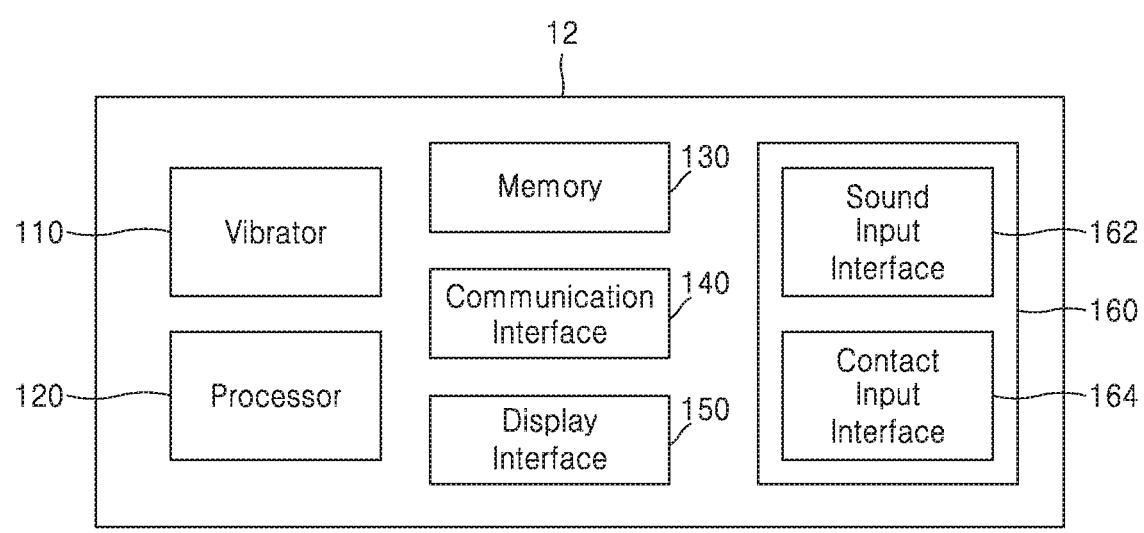
FIG. 9 is a block diagram of an apparatus for tracking an acquaintance according to an example embodiment.

FIG. 9 is a block diagram of an apparatus for tracking an acquaintance according to an example embodiment.

Referring to FIG. 9, an acquaintance tracking apparatus 12 including a vibration unit 110 and a processor 120 may be provided. The acquaintance tracking apparatus 12 may include a mobile terminal. For example, the acquaintance tracking apparatus 12 may include mobile phones, smart phones, notebook computers, digital broadcasting terminals, PDAs, PMPs, navigations, tablet PCs, watch-type terminals (smartwatches), glasses-type terminals (smart glasses), HMDs, etc.

The vibration unit 110 may include a plurality of vibrators configured to vibrate in response to ambient voices, a sound inlet to which the ambient voices enter, and sound outlets through which the ambient voices input through the sound inlet are emitted, a case, a supporting unit, and a through hole. The plurality of vibrators, the sound inlet, the sound outlet, the case, the supporting unit, and the hole are substantially identical to the plurality of vibrators 111_$k$, the sound inlet 113$i$, the sound outlet 113$o$, the case 113, the supporting unit 112, and the through hole TH described with reference to FIGS. 1 through 3. Surrounding voices may include a plurality of individual voices. The plurality of individual voices may have tone colors different from each other. The plurality of individual voices may be generated from people, respectively.

A direction of an incident sound may be detected by comparing an output size of each of the plurality of vibrators with respect to the sound incident from an arbitrary direction.

The processor 120 may separate the ambient voices into a plurality of individual voices different from each other based on intensities of output signals of the plurality of vibrators. For example, the processor 120 may detect directions of voices of two or more people at different locations in an azimuth direction by comparing intensities of the output signals of the plurality of vibrators and may select vibrators for acquiring voice information based on the directions of the detected people. The plurality of individual voices may be separated from the ambient voices by the selection of the vibrators.

The processor 120 may determine an acquaintance voice from the plurality of individual voices. The acquaintance's voice may be an individual voice having a target tone color among the plurality of individual voices. The processor 120 may generate information about tone colors of the plurality of individual voices based on waveforms of output signals of the plurality of vibrators. The processor 120 may determine an individual voice having a tone color substantially identical to a target tone color of an acquaintance voice by comparing the tone colors of the plurality of individual voices with the target tone color. In example embodiments, information about the target tone color may be stored in advance in a memory 130 which will be described below. In other example embodiments, the information about the target tone color may be provided to the processor 120 from a server by a communication interface 140 which will be described below.

The processor 120 may measure distances between the acquaintance tracking apparatus 12 and people based on intensities of output signals of the plurality of vibrators. For example, the processor 120 may determine values corresponding to the intensities of the output signals of the plurality of vibrators as the distances between the acquaintance tracking apparatus 12 and the people that generate a plurality of individual voices corresponding to the plurality of vibrators by using matching data.

The acquaintance tracking apparatus 12 may further include the memory 130. The memory 130 may store data supporting various functions of the acquaintance tracking apparatus 12. The memory 130 may store an application program to be driven by the acquaintance tracking apparatus 12, data for operating the acquaintance tracking apparatus 12, and commands. The application program may be stored in the memory 130 and may be installed in the acquaintance tracking apparatus 12 to be driven to perform functions of the acquaintance tracking apparatus 12 by the processor 120. In example embodiments, the memory 130 may store tone color information of an acquaintance voice. In other example embodiments, the memory 130 may not store tone color information of the acquaintance voice. The memory 130 may store data, such as sensitivities of the plurality of vibrators according to incidence directions of a plurality of individual voices.

The acquaintance tracking apparatus 12 may further include the communication interface 140. The communication interface 140 may include at least one element that enables communication between the acquaintance tracking apparatus 12 and external electronic devices or between the acquaintance tracking apparatus 12 and a server. For example, communication by the communication interface 140 may include a near field communication, for example, a Bluetooth communication, a Bluetooth low energy (BLE) communication, a near field wireless communication, a wireless LAN (WLAN-WiFi) communication, a Zigbee communication, an infrared data association (IrDA) communication, a Wi-Fi Direct (WFD) communication, an ultra-wideband (UWB) communication, and an Ant+ communication. The communication interface 140 may also include at least one mobile communication interface. The mobile communication interface may transmit and receive wireless signals to and from at least one of a base station, an external terminal, and a server on a mobile communication network. The wireless signals may include various types of data according to transmission and reception of a voice signal, a video call signal, or a text/multimedia message. The communication interface 140 may receive global positioning system (GPS) coordinates of the acquaintance tracking apparatus 12.

The acquaintance tracking apparatus 12 may further include a display interface 150. The display interface 150 may include an image output interface and a sound output interface. The image output interface 152 may represent a relative location and/or an absolute location of an acquaintance as an image. For example, a direction of an acquaintance about the acquaintance tracking apparatus 12 may be represented as an arrow, and a distance between the acquaintance tracking apparatus 12 and the acquaintance may be represented as a figure. The sound output interface 154 may represent a relative location and/or an absolute location of an acquaintance as a sound.

The acquaintance tracking apparatus 12 may further include an input interface 160. The input interface 160 may include a sound input interface 162 and a contact input interface 164. The sound input interface 162 may collect ambient voices of the acquaintance tracking apparatus 12. For example, the sound input interface 162 may include a microphone or a microphone array. The contact input interface 164 may receive information from a user. For example, the contact input interface 164 may include a touch key and/or a push key (a mechanical key). The user may select a voice having a target tone color through the contact input interface 164.

The example embodiment may provide the acquaintance tracking apparatus 12 for tracking a location of an acquaintance among people.

Figure 10:
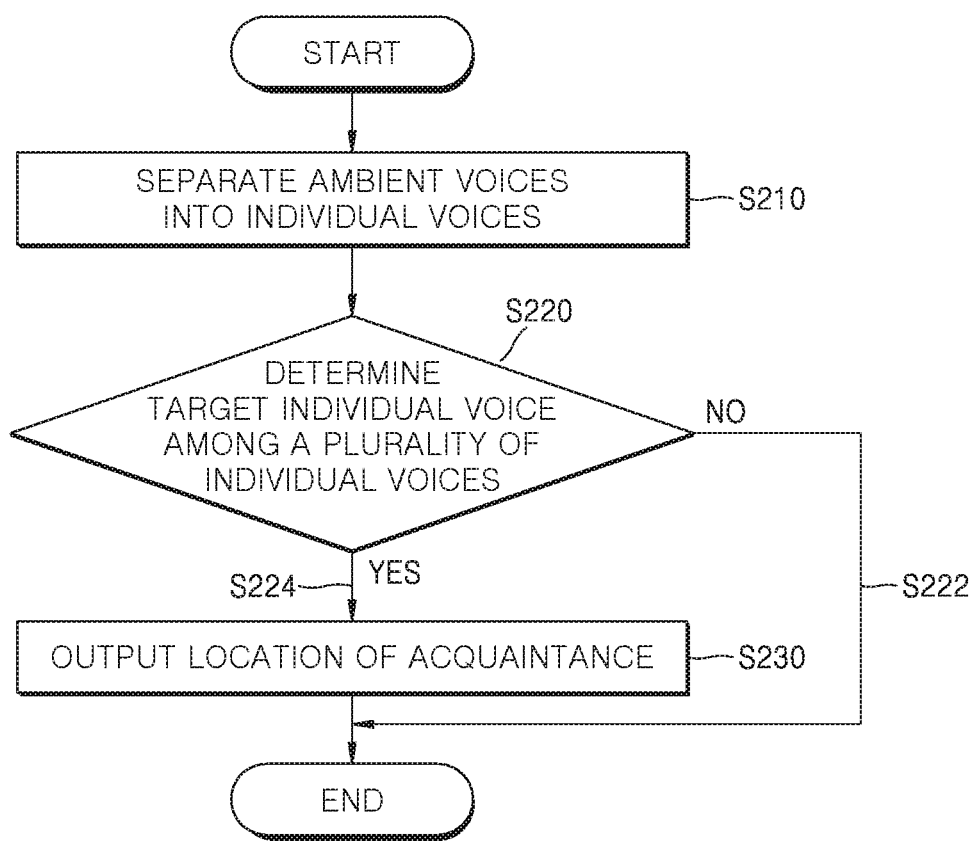
FIG. 10 is a flowchart of a method of tracking an acquaintance, according to an example embodiment.
Figure 11:
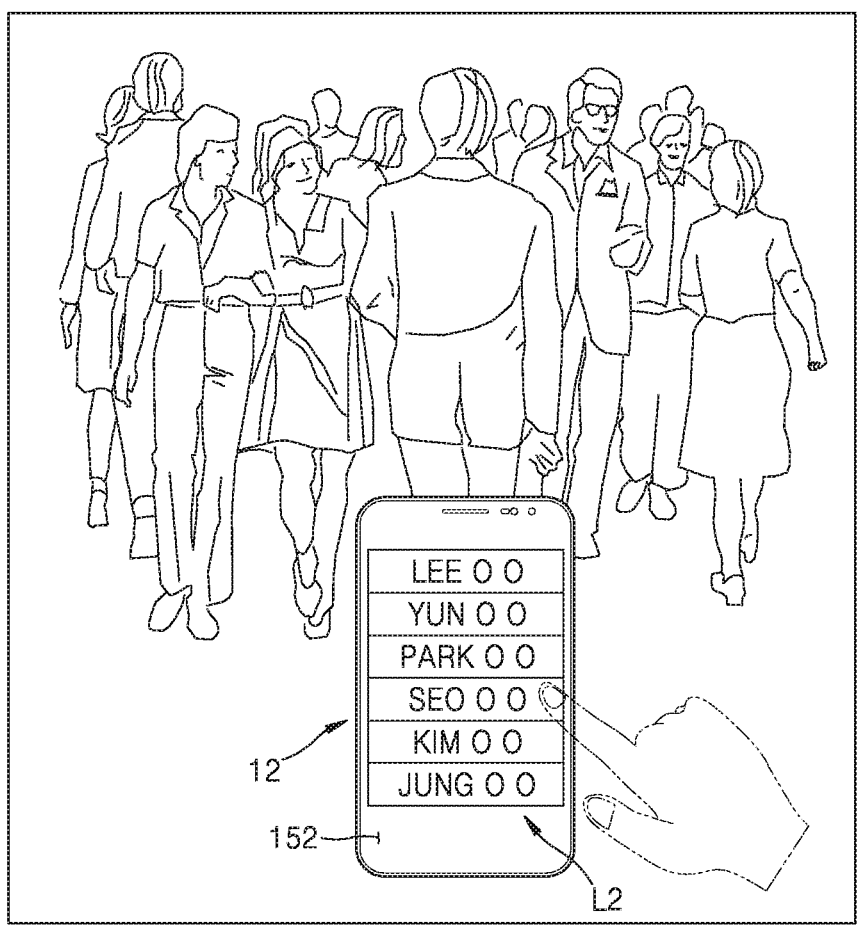
FIG. 11 is a diagram for explaining the method of tracking an acquaintance of FIG. 10.
Figure 12:
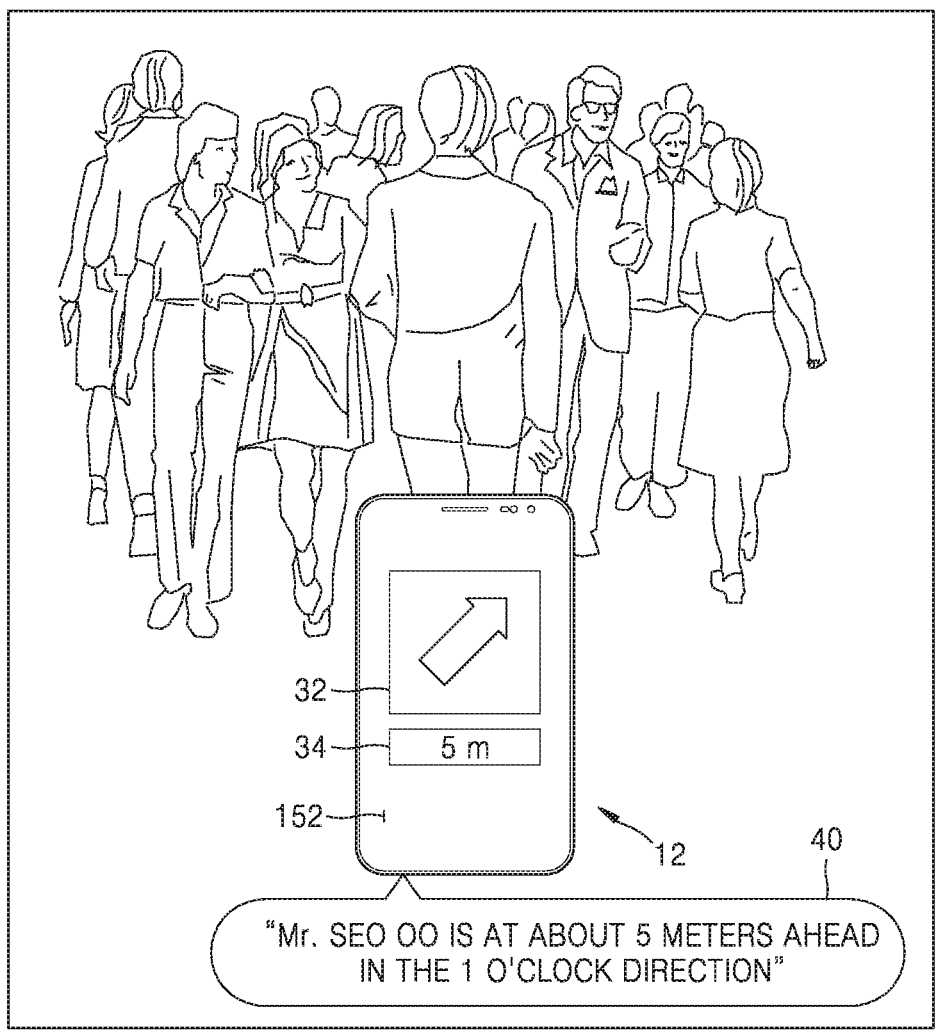
FIG. 12 is a diagram for explaining the method of tracking an acquaintance of FIG. 10.
Figure 13:
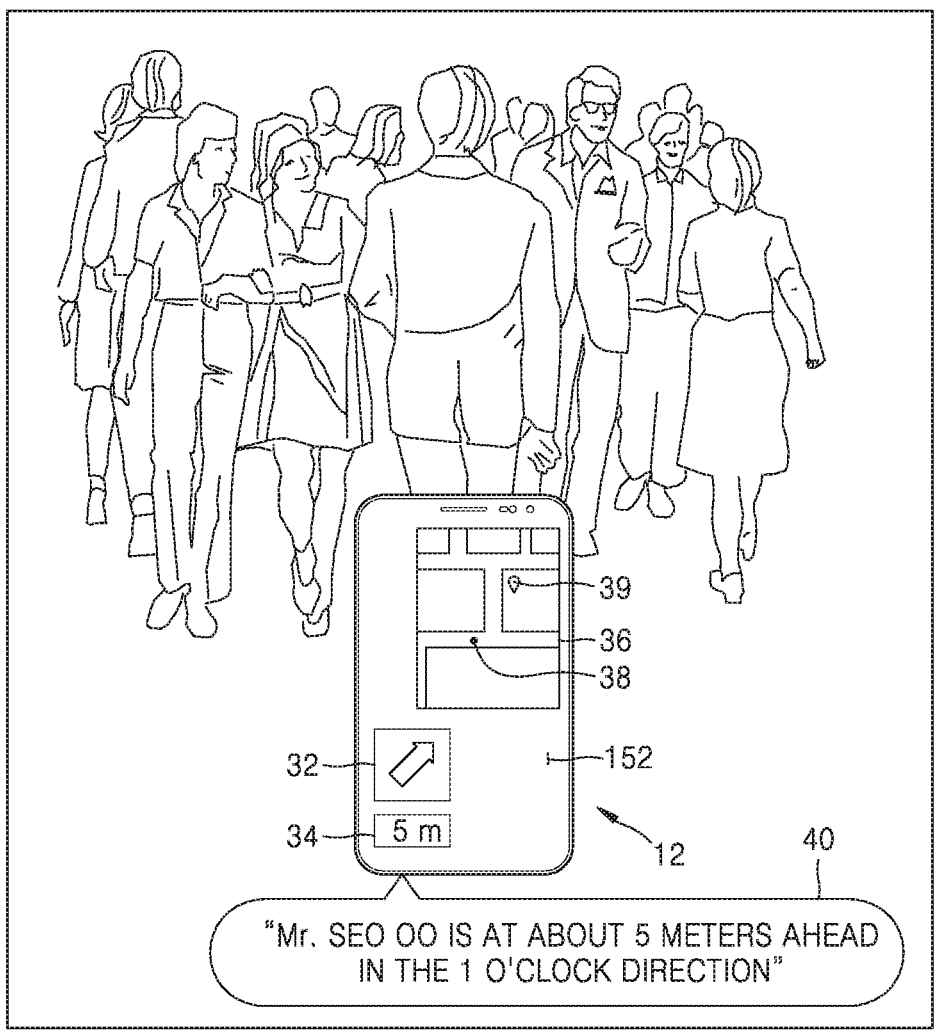
FIG. 13 is a diagram for explaining the method of tracking an acquaintance of FIG. 10.

FIG. 10 is a flowchart of a method of tracking an acquaintance, according to an example embodiment. FIGS. 11 through 13 are diagrams for explaining the method of tracking an acquaintance according to an example embodiment.

Referring to FIGS. 10 and 11, an acquaintance tracking apparatus 12 may be provided between people. The acquaintance tracking apparatus 12 may be substantially the same as the acquaintance tracking apparatus 12 described with reference to FIG. 9. The people may generate ambient voices. The ambient voices may include a plurality of individual voices respectively generated by the people. The plurality of individual voices respectively may have tone colors different from each other.

A processor may separate the ambient voices into the plurality of individual voices (S210). For example, the processor may separate the plurality of individual voices from the ambient voices based on output intensities of a plurality of vibrators provided from a vibration unit. For example, the processor may detect directions of two or more people at different locations in an azimuth direction by comparing intensities of the output signals of the plurality of vibrators, and may select vibrators for acquiring voice information based on the directions of the detected people. The plurality of individual voices may be separated from the ambient voices by the selection of the vibrators.

The processor may determine a target individual voice from the plurality of individual voices (S220). The target individual voice may be an individual voice having a target tone color among the plurality of individual voices. The target tone color may be a tone color of an acquaintance voice that a user 1 is seeking. As depicted in FIG. 11, an acquaintance voice having a target tone color may be selected by the user 1.

The selection of an acquaintance voice having a target tone color may be performed by using the contact input interface 164. For example, any one of an acquaintance list L2 displayed on the image output interface 152 may be touched by the user 1, and thus, an acquaintance voice having a target tone color may be selected. In example embodiments, information of a target tone color may be stored in a memory in advance. In other example embodiments, information of a target tone color may be provided to the processor 120 from a server by the communication interface 140.

If there is no acquaintance voice among a plurality of individual voices (S222), the processor 120 may terminate the location tracking of the acquaintance.

Referring to FIGS. 10, 12, and 13, if there is an acquaintance voice among a plurality of individual voices (S224), the processor 120 may output a location of an acquaintance by controlling the display interface 150. (S230) As depicted in FIG. 12, the image output interface 152 and the sound output interface 154 may output a relative location of the acquaintance. The image output interface 152 may display a direction image 32 of the acquaintance about the acquaintance tracking apparatus 12 and a distance image 34 between the acquaintance tracking apparatus 12 and the acquaintance. For example, the image output interface 152 may output an arrow and a figure as the direction image 32 and the distance image 34, respectively. The sound output interface 154 may output a guidance voice 40 of a direction of the acquaintance about the acquaintance tracking apparatus 12 and a distance between the acquaintance tracking apparatus 12 and the acquaintance. For example, the sound output interface 154 may output a guidance voice 40, for example, saying "Mr. Seo oo is at about 5 meters ahead in the 1 o'clock direction".

As depicted in FIG. 13, the display interface 150 may output a relative location and an absolute location of the acquaintance. For example, the image output interface 152 may output a map 36 on which a location image 38 of the acquaintance tracking apparatus 12 and an absolute location image 39 of the acquaintance are shown. Although it is depicted that the sound output interface 154 outputs the guidance voice 40 about the relative location of the acquaintance, embodiments are not limited thereto. For example, the sound output interface 154 may output the guidance voice 40 about an absolute location of the acquaintance.

When a distance between the acquaintance tracking apparatus 12 and the acquaintance is less than a certain value, the acquaintance tracking apparatus 12 may terminate the location tracking about the acquaintance. For example, when a distance between the acquaintance tracking apparatus 12 and the acquaintance is less than one meter, the location tracking about the acquaintance may be terminated.

According to the example embodiment, a sound source tracking apparatus configured to track a required sound source among a plurality of sound sources may be provided. According to the example embodiment, a method of tracking a required sound source among a plurality of sound sources may be provided. According to the example embodiment, an acquaintance tracking apparatus for tracking an acquaintance among people may be provided.

While example embodiments have been described with reference to the figures, it will be understood by those of ordinary skill in the art that various changes in form and details may be made therein without departing from the spirit and scope as defined by the following claims

What is claimed is:

1. A sound source tracking apparatus comprising:
a vibration unit comprising:
vibrators configured to vibrate in response to an ambient sound, the ambient sound comprising individual sounds;
a sound inlet configured to receive the ambient sound; and
sound outlets configured to emit the ambient sound, each sound outlet of the sound outlets facing each vibrator of the vibrators, respectively; and
a processor configured to separate the ambient sound into the individual sounds, to determine a target individual sound having a target tone color among the individual sounds, and to obtain a relative location of a target sound source that generates the target individual sound,
wherein the vibrators are arranged around a central axis of the sound inlet.

2. The sound source tracking apparatus of claim 1, wherein the processor is further configured to generate information about tone colors of the individual sounds based on output waveforms of the vibrators, and determine the target individual sound by comparing the tone colors of the individual sounds with the target tone color.

3. The sound source tracking apparatus of claim 2, further comprising:
a memory configured to store information about the target tone color,
wherein the processor is further configured to determine the target individual sound by comparing the information about the target tone color stored in the memory with the information about the tone colors of the individual sounds.

4. The sound source tracking apparatus of claim 2, further comprising:
a communication interface configured to receive information about the target tone color from a server,
wherein the processor is further configured to determine the target individual sound by comparing the information about the target tone color with the information about the tone colors of the individual sounds.

5. The sound source tracking apparatus of claim 1, wherein the processor is further configured to obtain directions of sound sources that generate the individual sounds based on output intensities of the vibrators, and separate the ambient sound into the individual sounds based on the directions of the sound sources.

6. The sound source tracking apparatus of claim 5, wherein the processor is configured to obtain the relative location of the target sound source by obtaining a distance between the vibration unit and the target sound source based on the output intensities of the vibrators and by obtaining a direction of the target sound source based on the output intensities of the vibrators.

7. The sound source tracking apparatus of claim 1, further comprising:
an image output interface configured to output the relative location of the target sound source as an image based on information about the relative location of the target sound source received from the processor.

8. The sound source tracking apparatus of claim 1, further comprising:
a sound output interface configured to output the relative location of the target sound source as a voice based on information about the relative location of the target sound source received from the processor.

9. The sound source tracking apparatus of claim 1, further comprising:
a communication interface configured to receive global positioning system coordinates,
wherein the processor is further configured to obtain an absolute location of the target sound source based on GPS coordinate information and information about the relative location of the target sound source.

10. A method of tracking a sound source, the method comprising:
collecting an ambient sound and separating the ambient sound into individual sounds;
determining a target individual sound among the individual sounds;
obtaining a relative location of a target sound source that generates the target individual sound,
wherein the target individual sound is an individual sound having a target tone color among the individual sounds, and
wherein the individual sounds are separated from the ambient sound based on output intensities of vibrators included in a vibration unit that vibrate in response to the ambient sound,
wherein the vibration unit further comprises:
a sound inlet configured to receive the ambient sound; and
sound outlets configured to emit the ambient sound, each sound outlet of the sound outlets facing each vibrator of the vibrators, respectively, and
wherein the vibrators are arranged around a central axis of the sound inlet.

11. The method of claim 10, further comprising:
generating information about tone colors of the individual sounds based on output waveforms of the vibrators,
wherein the determining of the target individual sound comprises comparing the tone colors of the individual sounds with the target tone color.

12. The method of claim 10, further comprising:
obtaining directions of sound sources that generate the individual sounds based on the output intensities of the vibrators,
wherein the individual sounds are separated from the ambient sound based on the directions of the sound sources.

13. The method of claim 10, wherein the obtaining of the relative location of the target sound source comprises:
obtaining a distance between a location where the ambient sound is collected and the target sound source based on the output intensities of the vibrators; and
obtaining a direction of the target sound source based on the output intensities of the vibrators.

14. The method of claim 10, further comprising:
outputting information of the relative location of the target sound source on a display interface.

15. The method of claim 10, further comprising:
obtaining an absolute location of the target sound source based on global positioning system coordinates of a location where the ambient sound is collected and the relative location of the target sound source.

16. An acquaintance tracking apparatus comprising:
a vibration unit comprising:
  vibrators configured to vibrate in response to ambient voices;
  a sound inlet configured to receive the ambient voices, the ambient voices comprising individual voices; and
  sound outlets configured to emit the ambient sound, each sound outlet of the sound outlets facing each vibrator of the vibrators, respectively;
a processor configured to determine a voice of an acquaintance among the individual voices and to obtain a relative location of the acquaintance; and
a display interface outputting the relative location of the acquaintance,
wherein the vibrators are arranged around a central axis of the sound inlet.

17. The acquaintance tracking apparatus of claim 16, wherein the processor is further configured to generate information of tone colors of the individual voices based on output waveforms of the vibrators and determine the voice of the acquaintance by comparing the tone colors of the individual voices with information about a tone color of the voice of the acquaintance.

18. The acquaintance tracking apparatus of claim 17, further comprising:
a memory configured to store the information about the tone color of the voice of the acquaintance,
wherein the processor is further configured to determine the voice of the acquaintance by comparing the information about the tone color of the voice of the acquaintance stored in the memory with information about the tone colors of the individual voices.

19. The acquaintance tracking apparatus of claim 17, further comprising:
a communication interface configured to receive the information about the tone color of the voice of the acquaintance from a server,
wherein the processor is further configured to determine the voice of the acquaintance by comparing the information about the tone color of the voice of the acquaintance with information about tone colors of the individual voices.

20. The acquaintance tracking apparatus of claim 16, wherein the processor is further configured to obtain the relative location of the acquaintance by obtaining a distance between the vibration unit and the acquaintance based on output intensities of the vibrators, and by obtaining a direction of the acquaintance based on the output intensities of the vibrators.

* * * * *